United States Patent Office 3,552,216
Patented Jan. 5, 1971

3,552,216
AIMING APPARATUS INCLUDING GYROSCOPIC REFERENCE SYSTEM
Marcel Pasquet, Neuilly-sur-Seine, France, assignor to Societe d'Applications Generales d'Electricite et de Mecanique SAGEM, Paris, France
Filed Oct. 23, 1968, Ser. No. 769,931
Claims priority, application France, Oct. 31, 1967, 126,637
Int. Cl. G01c 19/00
U.S. Cl. 74—5.34                10 Claims

ABSTRACT OF THE DISCLOSURE

A movable element, such as a mirror—which is supported by a gimbal system in a manner to be able to pivot about a first axis, which can itself pivot about a second axis orthogonal to the first axis—reflects a propagatory phenomenon, such as optical radiation, on to a receiver—which is disposed so that the propagatory phenomenon that it receives is coaxial to the second axis. The movable element is controlled by a reference platform stabilized and piloted by two gyroscopes having each a single degree of freedom.

---

This invention relates to aiming apparatus including a gyroscopic reference system, which apparatus comprises, on the one hand, a receiver or emitter device adapted to receive or to emit a propagatory phenomenon, and on the other hand, a movable element presenting reflective properties for this propagatory phenomenon and capable, by reflection of this propagatory phenomenon, of determining the straight line, called hereafter "line of sight," along which the propagatory phenomenon is directed, said movable element being supported by a gimbal system in a manner to be able to pivot about a first axis, which can itself pivot about a second axis orthogonal to the first axis, the receiver or emitter device being disposed so that the propagatory phenomenon that it receives or that it emits is coaxial to the second axis.

It has already been proposed, in apparatus of this type, to control the movable element by a reference platform pivotably mounted on a gimbal system about a third axis, parallel to the first axis about which the movable element pivots, this reference platform being connected in rotation to the movable element by coupling means procuring a reduction of 0.5 between the pivoting movements of the reference platform and the pivoting movements of the movable element.

This invention is more particularly concerned with optical aiming apparatus of the type mentioned above, that is to say apparatus in which the propagatory phenomenon is constituted by optical radiation, the movable element then being constituted by an optical reflector, such as a mirror or a prism.

An object of the invention is to improve the precision of such aiming apparatus, to render its construction simpler and to increase its reliability.

Aiming apparatus according to the invention is characterized by the fact that the reference platform is stabilized and piloted by two gyroscopes having each a single degree of freedom, hence presenting each an input axis, an output axis and a spin axis, these two gyroscopes being carried by the reference platform and being disposed so that, the input axis of the first gyroscope is parallel to the first axis (and to the third axis), this first gyroscope acting on a first torque motor controlling the pivoting of the movable element about the first axis (and of the reference platform about the third axis), and the input axis of the second gyroscope determines a trirectangular trihedral with the input axis of the first gyroscope and the line of sight, this second gyroscope acting on a second torque motor controlling the pivoting of the movable element about the second axis, control means being provided for acting, directly or indirectly, in addition to the action of the first and second gyroscopes, on one and/or the other of the two (first and second) torque motors.

The invention will be able, in any case, to be well understood with the aid of the following complementary description as well as of the accompanying drawings, which complementary description and drawings are given to illustrate preferred embodiments of the invention, and of course are not of a limitative nature.

The particular embodiments which will now be described relate to optical aiming apparatus, that is to say aiming apparatus in which the propagatory phenomenon is constituted by optical radiation.

Figure 1:
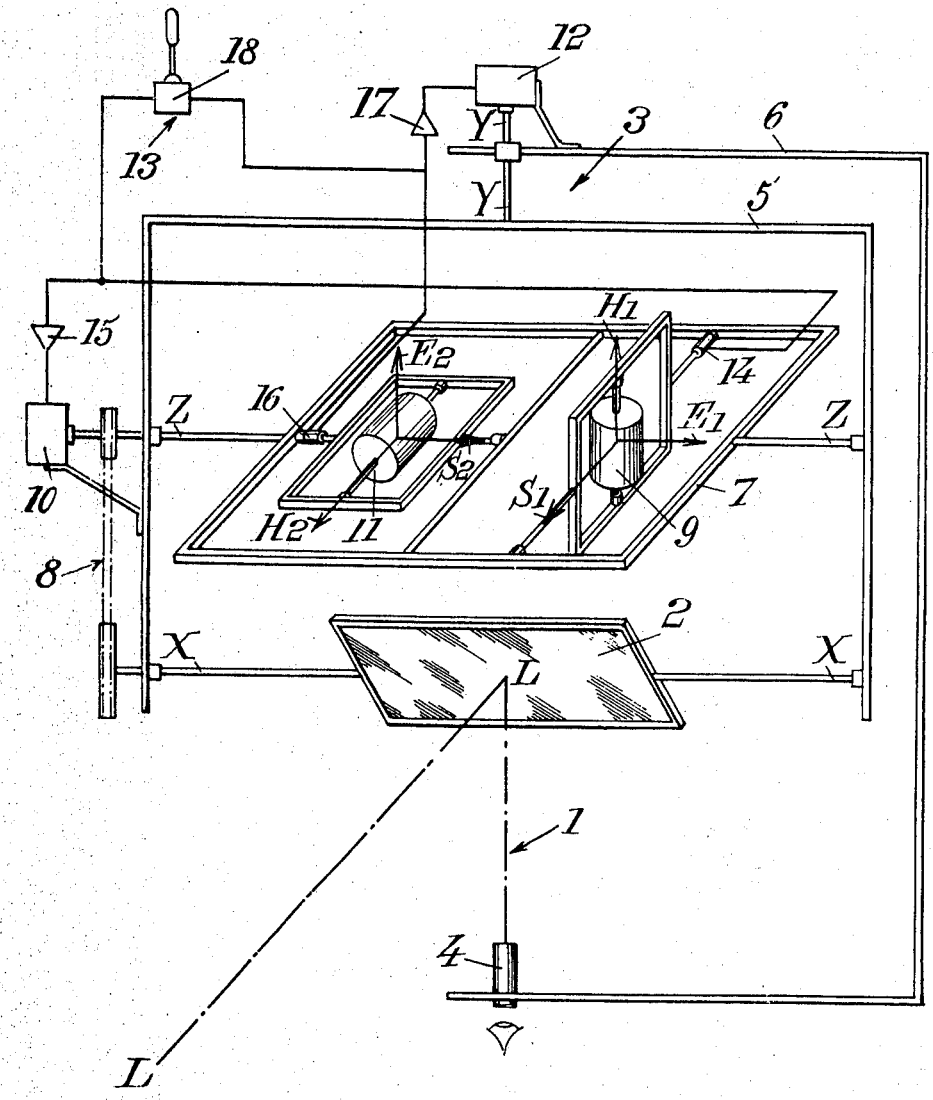
FIG. 1 represents, in a schematic manner and in perspective, the essential elements of an aiming apparatus established according to a first embodiment of the invention.
Figure 2:
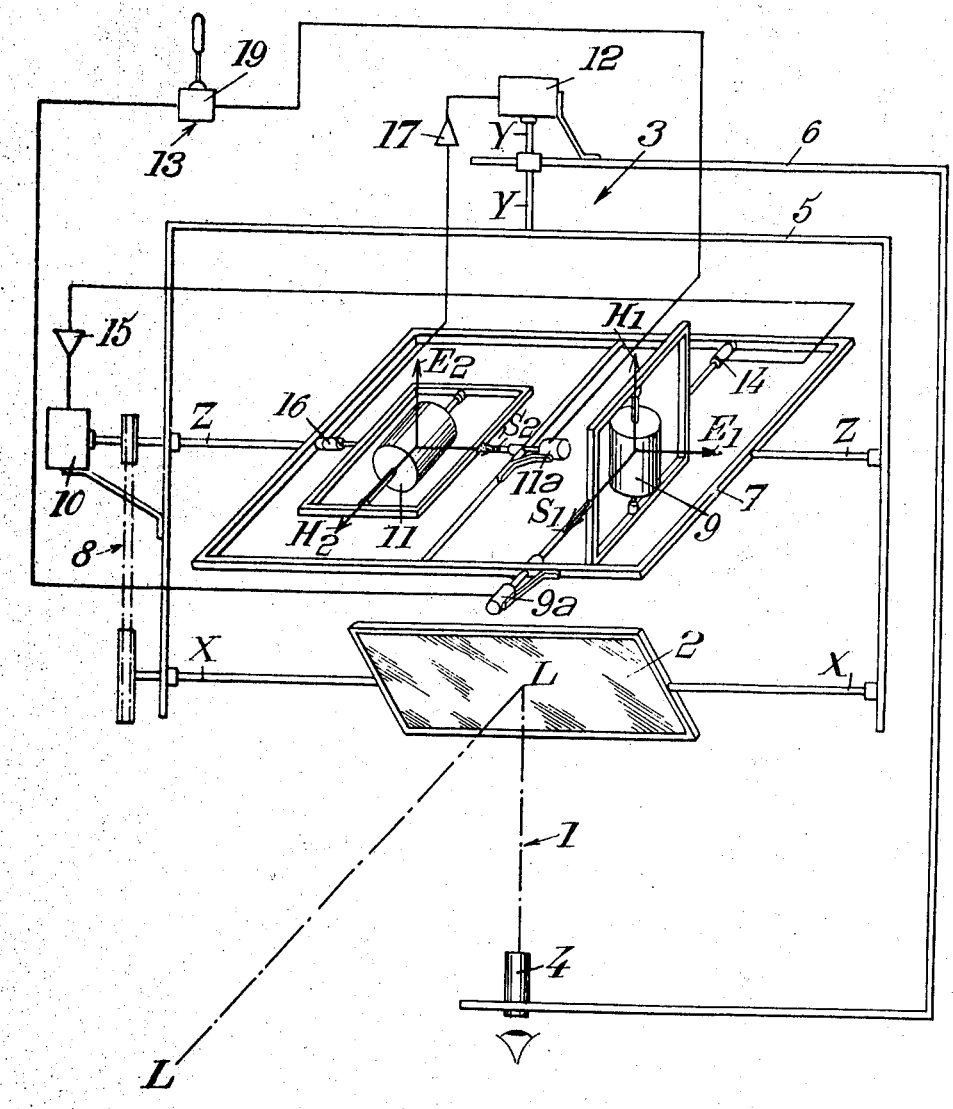
FIG. 2 shows, in the same conditions as in FIG. 1, an aiming apparatus established according to another embodiment of the invention.

This optical aiming apparatus comprises, as shown in FIGS. 1 and 2, a receiver device 1 comprising an optical telescope 4 behind which can be located the eye of an operator, this receiver device being adapted to receive optical radiation, and a movable element constituted by a reflecting mirror 2, capable by reflection of the optical radiation, of determining a line of sight LL along which the optical radiation is directed, this reflecting mirror 2 being supported by a gimbal system 3 in a manner to be able to pivot about a first axis XX, which can itself pivot about a second axis YY orthogonal to the first axis XX, the receiver device 1 being disposed so that the optical radiation that it receives is coaxial to the second axis YY.

The gimbal system 3 can advantageously comprise, a gimbal 5 on which is mounted the reflecting mirror 2 pivotable about the first axis XX which will be supposed to be horizontal and which will constitute the elevation axis of the aiming apparatus, and a support 6 on which is mounted the gimbal 5 pivotable about the second axis YY which will then be vertical and which will constitute the azimuth axis of the aiming apparatus.

In this apparatus, in a manner which is known in itself, the reflecting mirror 2 is controlled by a reference platform 7 pivotably mounted on the gimbal 5 about a third axis ZZ parallel to the first axis XX, this reference platform 7 being connected in rotation to the reflecting mirror 2 by coupling means 8 procuring a reduction of 0.5 between the pivoting movements of the reference platform 7 and the pivoting movements of the reflecting mirror 2.

This being the case, according to the principal feature of the invention, the reference platform 7 is stabilized and piloted by two gyroscopes 9 and 11 having each a single degrees of freedom, hence presenting each an input axis, an output axis and a spin axis, these two gyroscopes 9 and 11 being carried by the reference platform 7 and being disposed so that the input axis $E_1$ of the first gyroscope 9 is parallel to the first axis XX (and to the third axis ZZ), this first gyroscope 9 acting on a first torque motor 10 controlling the pivoting of the reflecting mirror 2 about the first axis XX (and of the reference platform 7 about the third axis ZZ), this first gyroscope 9 constituting the elevation gyroscope of the aming apparatus, and the input axis $E_2$ of the second gyroscope 11 determines a trirectangular trihedral with the input axis $E_1$ of the first gyroscope 9 and the line of sight LL, this second gyroscope 11 acting on a second torque motor 12 controlling the pivoting of the reflecting mirror 2 about the second axis YY, this second gyroscope 11 constituting the azimuth gyroscope of the aiming apparatus, control means 13 being provided for acting, directly or indirectly, in addition to the action of the first and second gyroscopes 9 and 11, on one and/or the other of the first and second torque motors 10 and 12.

For this purpose, as shown in FIGS. 1 and 2, there are provided, a first angle detector 14 mounted on the output axis $S_1$ of the first gyroscope 9 and connected to the first torque motor 10 by a first amplifier 15, and a second angle detector 16 mounted on the output axis $S_2$ of the second gyroscope 11 and connected to the second torque motor 12 by a second amplifier 17.

According to the embodiment illustrated in FIG. 1, the control means 13 act directly on one and/or the other of the two torque motors 10 and 12, and, in this case, the two gyroscopes 9 and 11 are each constituted by a gyrometer.

In these conditions, the control means 13 can advantageously be constituted by an electric switch having a piloting handle 18, the orders delivered by this switch and intended to act directly on the first torque motor 10 being combined with the orders delivered by the first gyroscope 9, whereas the orders delivered by this switch and intended to act directly on the second torque motor 12 are combined with the orders delivered by the second gyroscope 11.

According to the embodiment illustrated in FIG. 2, the control means 13 act indirectly on one and/or the other of the two torque motors 10 and 12, and, in this case, the two gyroscopes 9 and 11 are each constituted by an integrating gyroscope or a gyrometer including a torque motor, this torque motor being designated by the reference character 9a in respect of the first gyroscope 9 and by the reference character 11a in respect of the second gyroscope 11.

In these conditions, the control means 13 can advantageously be constituted by an electric switch having a piloting handle 19, the orders delivered by this switch and intended to act indirectly on the first torque motor 10 control the torque motor 9a of the constituent gyrometer of the first gyroscope 9, whereas the orders delivered by this switch and intended to act indirectly on the second torque motor 12 control the torque motor 11a of the constituent gyrometer of the second gyroscope 11.

Certain particular dispositions of the two gyroscopes 9 and 11 on the reference platform 7 will now be examined.

The two embodiments illustrated respectively in FIGS. 1 and 2 specify a particular disposition of the two gyroscopes 9 and 11 on the reference platform 7, according to which disposition the two gyroscopes 9 and 11 are disposed in such a manner that the input axis $E_2$ of the second gyroscope 11 is perpendicular to the plane determined by the input axis $E_1$ and the output axis $S_1$ of the first gyroscope 9, the output axis $S_1$ of the first gyroscope 9 being enslaved to remain parallel to the line of sight LL.

Figure 3:
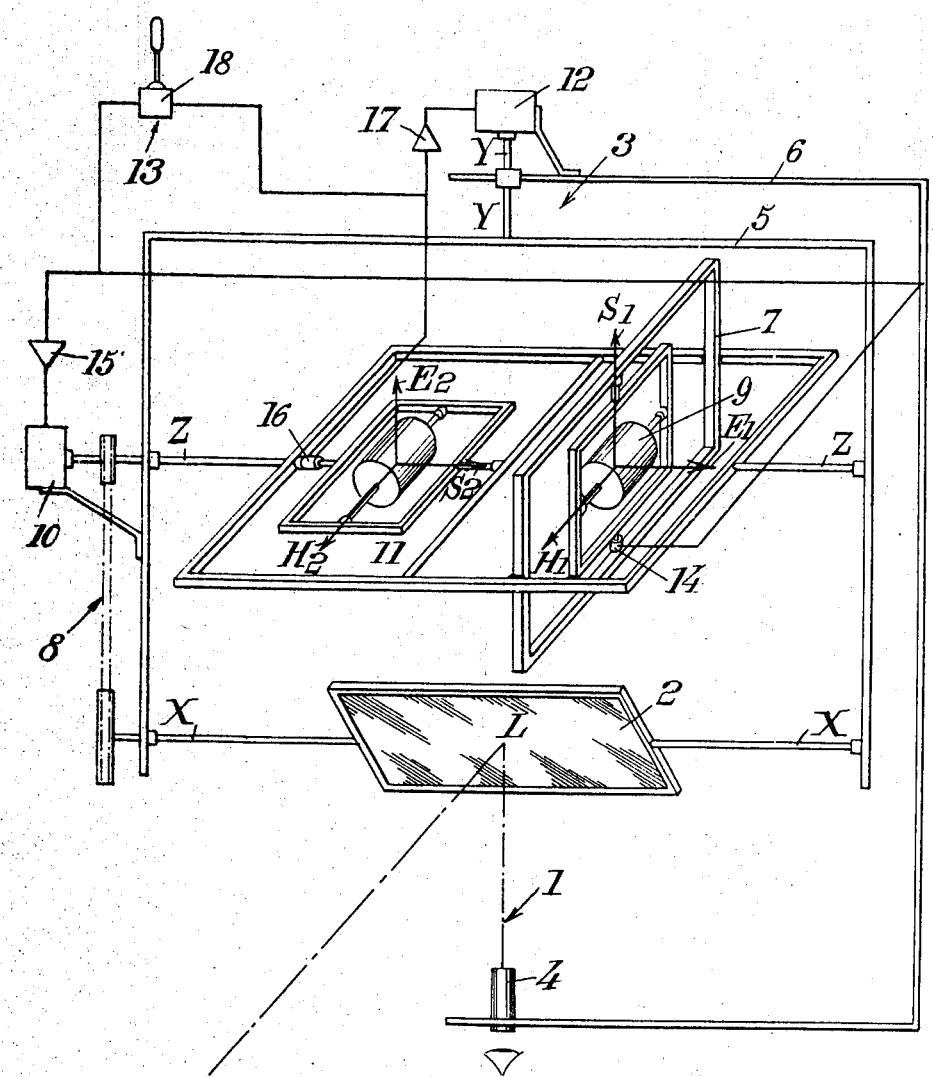
FIG. 3 illustrates, still in the same conditions as in FIG. 1, a variant of the embodiment illustrated in this FIG. 1.

But a variant of these two embodiments can also be used, this variant being illustrated in FIG. 3 in which the same reference characters designate the same members as in FIG. 1. This variant specifies another particular disposition of the two gyroscopes 9 and 11 on the reference platform 7, according to which disposition the two gyroscopes 9 and 11 are disposed in such a manner that the input axis $E_2$ of the second gyroscope 11 is perpendicular to the plane determined by the input axis $E_1$ and the spin axis $H_1$ of the first gyroscope 9, the spin axis $H_1$ of the first gyroscope 9 being enslaved to remain parallel to the line of sight LL.

The variant illustrated in FIG. 3 presents, with respect to the embodiments illustrated in FIGS. 1 and 2, the advantage of avoiding any coupling between the first gyroscope 9 and the second gyroscope 11.

It has been supposed that the variant shown in FIG. 3 was established from the embodiment illustrated in FIG. 1, but an aiming apparatus could also be realized according to another variant of the invention (not shown), according to which the disposition of the gyroscopes would be the same as in FIG. 3 but with the control means acting as indicated in FIG. 2.

The present invention provides simple optical aiming apparatus which permits a line of sight to be maintained with high precision in the direction of an objective, whatever be the displacement of this objective or the movements to which the support of the aiming apparatus can be subjected.

It is thus particularly advantageous to mount an optical aiming apparatus according to the invention on a vehicle, with a view to guiding a missile in the direction of a movable objective.

Many modified embodiments and variants of the present invention are possible, such as, for example, variants in which the aiming apparatus, instead of being an optical aiming apparatus would be an infrared aiming apparatus, the receiver or emitter device then being an infrared type device.

In view of the numerous modifications and variants possible without departing from the spirit or scope of the invention, the invention should not be limited to the particular embodiments described by way of example.

I claim:

1. An aiming apparatus for a propagatory phenomenon including a gyroscopic reference system, said apparatus comprising: a receiving device for receiving a propagatory phenomenon; a movable element, presenting reflective properties for said propagatory phenomenon, for reflecting said propagatory phenomenon and for determining, by reflection of said propagatory phenomenon, a line of sight along which the propagatory phenomenon is directed; a gimbal system for supporting said movable element to permit pivoting thereof about a first axis, said gimbal system itself being pivotable about a second axis orthogonal to the first axis and the propagatory phenomenon received by said receiving device being coaxial with said second axis; a reference platform for controlling said movable element pivotally mounted on said gimbal system about a third axis parallel to the first axis about which said movable element pivots, said reference platform being rotatably connected to said movable element by coupling means which provide a reduction of 0.5 between the pivoting movements of the reference platform and the pivoting movements of the movable element; first and second gyroscopes carried by said reference platform for stabilizing and piloting said reference platform, each said gyroscope having a single degree of freedom and being characterized by an input axis, an output axis and a spin axis, the input axis of the first gyroscope being parallel to said first axis and to said third axis, and the input axis of the second gyroscope determining a trirectangular trihedral with the input axis of the first gyroscope and the line of sight; a first torque motor controlled by said first gyroscope for controlling pivoting of said movable axis about said first axis and of said reference platform about said third axis; a second torque motor controlled by the second gyroscope for controlling the pivoting of a movable element about the second axis; and control means for controlling, in addition to the control provided by said first and second gyroscopes, at least one of said first and second torque motors.

2. Apparatus according to claim 1 comprising:
   a first angle detector mounted on the output axis of the first gyroscope and connected to the first torque motor by a first amplifier,
   and a second angle detector mounted on the output axis of the second gyroscope and connected to the second torque motor by a second amplifier.

3. Apparatus according to claim 1, wherein said control means act directly on at least one of the two torque motors, and said first and second gyroscopes each comprise a gyrometer.

4. Apparatus according to claim 3, wherein said control means comprise an electric switch including a piloting handle, the control signals delivered by this switch and intended to act directly on the first torque motor being combined with the control signals delivered by the first gyroscope, whereas the control signals delivered by this switch and intended to act directly on the second torque motor are combined with the control signals delivered by the second gyroscope.

5. Apparatus according to claim 1, wherein said control means act indirectly on at least one of the two torque motors, and said first and second gyroscopes each comprise an integrating gyroscope.

6. Apparatus according to claim 1, wherein said control means act indirectly on at least one of the two torque motors, and said gyroscopes each comprise a gyrometer including a torque motor respectively for the first gyroscope and for the second gyroscope.

7. Apparatus according to claim 6, wherein said control means comprise an electric switch including a piloting handle, the control signal delivered by this switch and intended to act indirectly on the first torque motor, controlling the torque motor of the constituent gyrometer of the first gyroscope, and the control signal delivered by this switch and intended to act indirectly on the second torque motor, controlling the torque motor of the constituent gyrometer of the second gyroscope.

8. Apparatus according to claim 1, wherein the input axis of the second gyroscope is perpendicular to the plane determined by the input axis and the output axis of the first gyroscope, the output axis of the first gyroscope being enslaved to remain parallel to the line of sight.

9. Apparatus according to claim 1, wherein the input axis of the second gyroscope is perpendicular to the plane determined by the input axis and the spin axis of the first gyroscope, the spin axis of the second gyroscope being enslaved to remain parallel to the line of sight.

10. An aiming apparatus for a propagatory phenomenon including a gyroscopic reference system, said apparatus comprising; a transmitting device for transmitting a propagatory phenomenon; a movable element, presenting reflective properties for said propagatory phenomenon, for reflecting said propagatory phenomenon and for determining, by reflection of said propagatory phenomenon, a line of sight along which the propagatory phenomenon is directed; a gimbal system for supporting said movable element to permit pivoting thereof about a first axis, said gimbal system itself being pivotable about a second axis orthogonal to the first axis and the propagatory phenomenon transmitted by said transmitting device being coaxial with said second axis; a reference platform for controlling said movable element pivotably mounted on said gimbal system about a third axis parallel to the first axis about which said movable element pivots, said reference platform being rotatably connected to said movable element by coupling means which provide a reduction of 0.5 between the pivoting movements of the reference platform and the pivoting movements of the movable element; first and second gyroscopes carried by said reference platform for stabilizing and piloting said reference platform, each said gyroscope having a single degree of freedom and being characterized by an input axis, and output axis and a spin axis, the input axis of the first gyroscope being parallel to said first axis and to said third axis, and the input axis of the second gyroscope determining a trirectangular trihedral with the input axis of the first gyroscope and the line of sight; a first torque motor controlled by said first gyroscope for controlling pivoting of said movable axis about said first axis and of said reference platform about said third axis; a second torque motor controlled by the second gyroscope for controlling the pivoting of a movable element about the second axis; and control means for controlling, in addition to the control provided by said first and second gyroscopes, at least one of said first and second torque motors.

References Cited
UNITED STATES PATENTS

| | | | |
|---|---|---|---|
| 2,883,863 | 4/1959 | Karsten et al. | 74—5.22 |
| 2,961,877 | 11/1960 | Edwards, Jr. | 74—5.34X |
| 3,084,342 | 4/1963 | Fuller et al. | 74—5.22X |
| 3,327,539 | 6/1967 | Moskowitz et al. | 74—5.22X |

MANUEL A. ANTONAKAS, Primary Examiner